United States Patent
Hughes (10) Patent No.: US 9,754,257 B1
(45) Date of Patent: *Sep. 5, 2017

(54) AUTHENTICATION SYSTEM AND METHOD (71) Applicant: Wells Fargo Bank, N.A., San Francisco, CA (US)

(72) Inventor: Alexander Zaharopoulos Hughes, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,136

(22) Filed: Mar. 16, 2015

Related U.S. Application Data (63) Continuation of application No. 13/452,326, filed on Apr. 20, 2012, now Pat. No. 8,984,607.

(51) Int. Cl.
G06F 7/04 (2006.01)
G06Q 20/40 (2012.01)
H04L 29/06 (2006.01)

(52) U.S. Cl.
CPC ......... *G06Q 20/4014* (2013.01); *H04L 63/08* (2013.01)

(58) Field of Classification Search
CPC ............. G06F 2221/2103; G06F 21/31; H04L 9/3271; H04L 63/083; H04L 9/3226; G06Q 20/4014
See application file for complete search history.

(56) References Cited

U.S. PATENT DOCUMENTS

| 8,369,842 | B2 | 2/2013 | Proctor et al. | |
|---|---|---|---|---|
| 2004/0073459 | A1* | 4/2004 | Barthell | G06F 19/3493 705/2 |
| 2005/0039057 | A1* | 2/2005 | Bagga | G06F 21/40 726/19 |
| 2008/0098464 | A1* | 4/2008 | Mizrah | G06F 21/36 726/5 |
| 2008/0103972 | A1* | 5/2008 | Lanc | G06Q 20/32 705/44 |
| 2009/0047928 | A1* | 2/2009 | Utsch | G06F 21/40 455/410 |
| 2009/0327131 | A1 | 12/2009 | Beenau et al. | |
| 2010/0250410 | A1* | 9/2010 | Song | G06F 21/33 705/30 |
| 2011/0172741 | A1 | 7/2011 | Roberts et al. | |

(Continued)

OTHER PUBLICATIONS

Final Office Action on U.S. Appl. No. 13/452,326 dated Jul. 16, 2014, 26 pages.

(Continued)

*Primary Examiner* — Mohammad W Reza
*Assistant Examiner* — Carlton Johnson
(74) *Attorney, Agent, or Firm* — Foley & Lardner LLP (57) ABSTRACT

An indication that a user wishes to conduct a bank transaction is received. An authentication path to be presented to the individual is pseudo-randomly determined. The authentication path comprises a combination of authentication challenges to be presented to the individual. A determination is made whether the user presented valid responses to the authentication challenges. The user is authenticated to conduct the bank transaction based on whether the user is determined to have presented valid responses to the authentication challenges.

27 Claims, 5 Drawing Sheets (56) References Cited

U.S. PATENT DOCUMENTS

2013/0160083 A1* 6/2013 Schrix ............... G07C 9/00309
726/3

OTHER PUBLICATIONS

Non-Final Office Action on U.S. Appl. No. 13/452,326, dated Dec. 18, 2013, 20 pages.
Notice of Allowance on U.S. Appl. No. 13/452,326, dated Nov. 7, 2014, 10 pages.

* cited by examiner

AUTHENTICATION SYSTEM AND METHOD

CROSS-REFERENCE TO RELATED APPLICATIONS

This application is a continuation of U.S. patent application Ser. No. 13/452,326, entitled "AUTHENTICATION SYSTEM AND METHOD," filed on Apr. 20, 2012, which is herein incorporated by reference in its entirety and for all purposes.

BACKGROUND

Financial institutions such as banks offer their customers (account holders) access to their accounts to perform transactions in a variety of ways, such as via on-line websites, at branch locations, via call centers, and so on. Authentication challenges may be presented to customers to attempt to confirm that the person that is attempting to perform a transaction is authorized to perform the transaction. Authentication challenges may be presented as authentication tasks, in which the customer is asked to perform a simple task that a fraudulent individual ("fraudster") would be unlikely to be able to perform. For example, the customer may be asked to provide a valid signature on a withdrawal slip prior to being permitted to withdraw money from an account. As another example, the customer may be asked to provide a physical object that can be used to authenticate the customer (e.g., driver's license, ATM card, and so on).

Authentication challenges may also be presented as authentication challenge questions in which the person is requested to provide information that is unlikely to be known by a fraudster. For example, in on-line banking situations, customers may be asked to provide a login ID, password and/or other information. The other information may include information that is obtained by the financial institution as a part of opening/maintaining the customer's account (e.g., the customer's date of birth, social security number, and so). The other information may also include other arbitrary information that is obtained from the customer exclusively for purposes of authenticating the customer (e.g., mother's maiden name, favorite high school sport, and so on). Such information is immaterial to the account, and the correctness of the information provided by the customer does not matter, except that the customer must always answer the question consistently in order for the authentication to be successful. For example, for the arbitrary challenge question "what is your favorite high school sport," if the user answers hockey, it does not matter whether the user's favorite high school sport really was hockey, rather, it only matters that the user answer the question consistently.

To increase the level of security, the path to authentication that the customer is required to take may be made longer by adding more authentication challenges. However, too many authentication challenges would make the experience highly inconvenient for customers. The vast majority of transactions are attempted by actual customers and not fraudsters. Only a relatively small percentage of attempted transactions are fraudulent. A tradeoff typically exists between the number of authentication challenges that are presented and the level of security that is obtained. An ongoing need exists to develop techniques for preventing fraudsters from conducting fraudulent transactions.

SUMMARY

According to an example embodiment, an indication that a user wishes to conduct a bank transaction is received. An authentication path to be presented to the individual is pseudo-randomly determined. The authentication path comprises a combination of authentication challenges to be presented to the individual. A determination is made whether the user presented valid responses to the authentication challenges. The user is authenticated to conduct the bank transaction based on whether the user is determined to have presented valid responses to the authentication challenges.

DETAILED DESCRIPTION OF EXAMPLE EMBODIMENTS

According to example embodiments, randomness is introduced into authentication paths taken by individuals, customers, account holders or other users attempting to obtain access to accounts. The authentication paths comprise a sequence of authentication challenges presented to the individual. If the individual provides valid responses to the authentication challenges, the individual is authenticated. Different authentication paths may be generated that comprise random variations in the content of responses that the individual needs to provide in order to be authenticated. Such randomness may be disruptive to attempts to conduct a fraudulent transaction, decreasing the ease with which such fraudulent transactions may be carried out. For example, in the context of an online banking website, the computer system of the fraudster cannot repeatedly transmit known combinations of information (e.g., login ID, arbitrary challenge question response, password) because sometimes different information is requested. Similar effects may be seen in store locations, call centers, and elsewhere. Security is enhanced without increasing the number of authentication challenges presented to the individual. From the perspective of the individual, the introduction of an additional authentication path does not add any inconvenience, because the information the user provides should already be known to the user. Hence, even if the fraudster is still successful in some instances, the described in connection with example embodiments may cause the success rate of the fraudster to be reduced while adding little if any inconvenience for non-fraudulent users. Security may be enhanced without necessarily increasing the number of authentication challenges to be presented to the user.

As will be appreciated, while the term "random" is sometimes used herein to describe how the authentication paths are determined, it will be appreciated that the authentication paths are determined pseudo-randomly. That is, the pseudo-randomly determined authentication paths may have properties that approximate the properties of randomly determined paths, but may not be truly random since real world computer systems cannot be made to operate randomly. Such randomness may also sometimes be referred to as jitter.

In some embodiments, an authentication path is randomly determined for each new transaction as a request for the transaction is received. For example, randomness may be introduced such that every time a user attempts to conduct a transaction (e.g., every time a user attempts to log onto an online banking area of the website), a different authentication path is randomly selected. In other embodiments, randomness may be introduced on a transaction-by-transaction basis, on a channel-by-channel basis, on a day-to-day basis, and/or in another manner. For example, randomness may be introduced such that an authentication path is randomly selected, but that authentication path is common to all users for a particular time period (e.g., a new authentication path is randomly selected for all users each day, each week, each month, etc.). Such an arrangement may be useful in call centers and store locations to simplify the authentication process for customer service representatives. As another example, randomness may be introduced such that an authentication path is randomly selected only for certain types of transactions (e.g., all funds transfers in excess of a threshold dollar value are subject to a fourth authentication step presented just prior to approval of the transaction). As another example, randomness may be introduced such that an authentication path is randomly selected only for a specified percentage of certain types of transactions (e.g., a randomly selected 20% of all funds transfers are subject to a fourth authentication step presented just prior to approval of the transaction). Such an arrangement may be useful for comparing the authentication rates of the two populations of transactions and thereby to assess the impact of introducing randomness into the authentication process. Other embodiments also exist.

Figure 1:
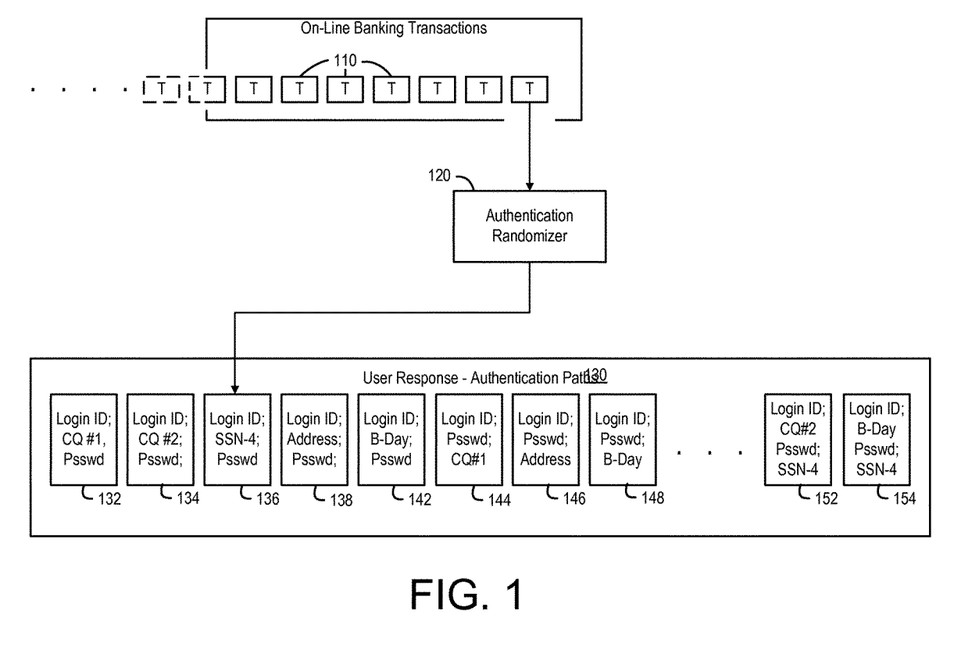
FIG. 1 is a schematic diagram of an authentication process for an on-line banking system according to an example embodiment.

Referring first to FIG. 1, FIG. 1 shows operation of an authentication process in the context of an on-line banking system according to an example embodiment. In FIG. 1, for purposes of providing an example, it is assumed that an authentication path is randomly determined for each new transaction. As described above, however, other arrangements are also possible.

As shown in FIG. 1, an on-line banking system receives an ongoing stream of transaction requests 110. The transaction requests provide indications that the user wishes to perform one or more as-yet unspecified transactions. For example, in the context of an on-line banking system, the transaction request may be a request to grant access to an on-line banking area of a website of the bank/financial institution. After the user is authenticated, as described below, the transaction request is approved and the user is permitted to enter the on-line banking area of the website to specify the transaction(s) to be performed. The authentication may remain effective for a period of time (e.g., during the remainder of the on-line banking session). The transactions may include withdrawing funds, purchasing one or more goods or services, transferring funds from one account to another account, changing account information, and so on. In other embodiments, the transaction request may also specify the transaction to be performed. In such embodiments, a separate authentication may be performed for each transaction to be performed by the user.

In other embodiments, at least some of the authentication path is determined after the transaction to be performed has been specified. For example, in an embodiment where randomness is introduced based on transaction type (e.g., all funds transfers in excess of a threshold dollar value are subject to a fourth authentication step presented just prior to approval of the transaction), the final portion of the authentication path may be determined after the transaction type has been specified.

As shown in FIG. 1, an authentication randomizer 120 sends the transaction down one of a plurality of available authentication paths 130. Different paths may comprise random variations in the content of responses that the user needs to provide in order to be authenticated. For example, as shown in FIG. 1, in a first authentication pathway 132, the individual is required to provide a login ID, then answer a first arbitrary challenge question (e.g., "What is your mother's maiden name?"), and finally provide a password. Similarly, in a second authentication pathway 134, the individual is required to provide a login ID, then answer a second arbitrary challenge question (e.g., "What was your first car?"), and finally provide a password. However, in a third authentication pathway 136 the individual is required to provide a login ID, then provide a portion (e.g., the last four digits) of the user's social security number, and finally provide a password. In a fourth authentication pathway 138, the individual is required to provide a login ID, then provide all or a portion of the address associated with the account, and finally provide a password. In a fifth authentication pathway 142, the individual is required to provide a login ID, then provide all or a portion of a birthday of the account holder, and finally provide a password.

In addition to introducing randomness into the content of the questions answered, randomness may also be introduced in other ways. For example, randomness may be introduced in the sequence with which questions are asked. For example, in FIG. 1, authentication paths 144, 146, 6 and 148 are shown that ask for the same information as authentication paths 132, 138, and 142, however, the information is requested to be provided a different sequence. Hence, the information that the individual provides is the same in authentication pathways 132 138, and 134. From the perspective of the individual, the introduction of an additional authentication path does not add any inconvenience, because the information is merely requested in a different order. Further, while avoiding inconvenience of the user is important, it may nevertheless be considered worthwhile to add additional authentication steps in some scenarios (e.g., for customers with large balances that are susceptible to being involved in higher dollar value transactions). Hence, randomness may also be introduced into the number of steps in the authentication path. Hence, in FIG. 1, authentication paths 152 and 154 are shown that comprise four authentication steps instead of three authentication steps. As described above, by introducing such random variations, the ability of fraudsters to carry out an automated attack is impaired.

Figure 2:
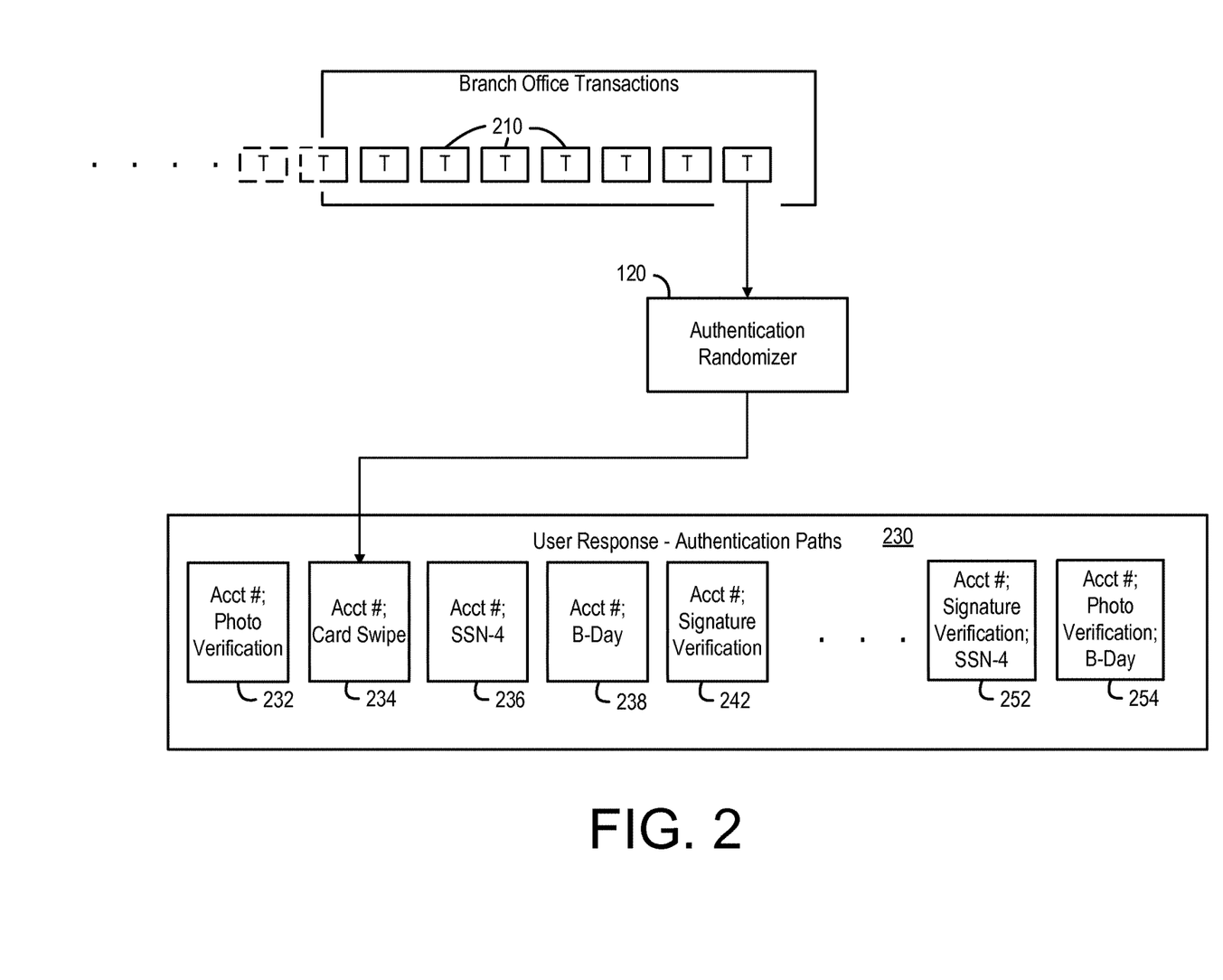
FIG. 2 is a schematic diagram of an authentication process for a store location according to an example embodiment.
Figure 3:
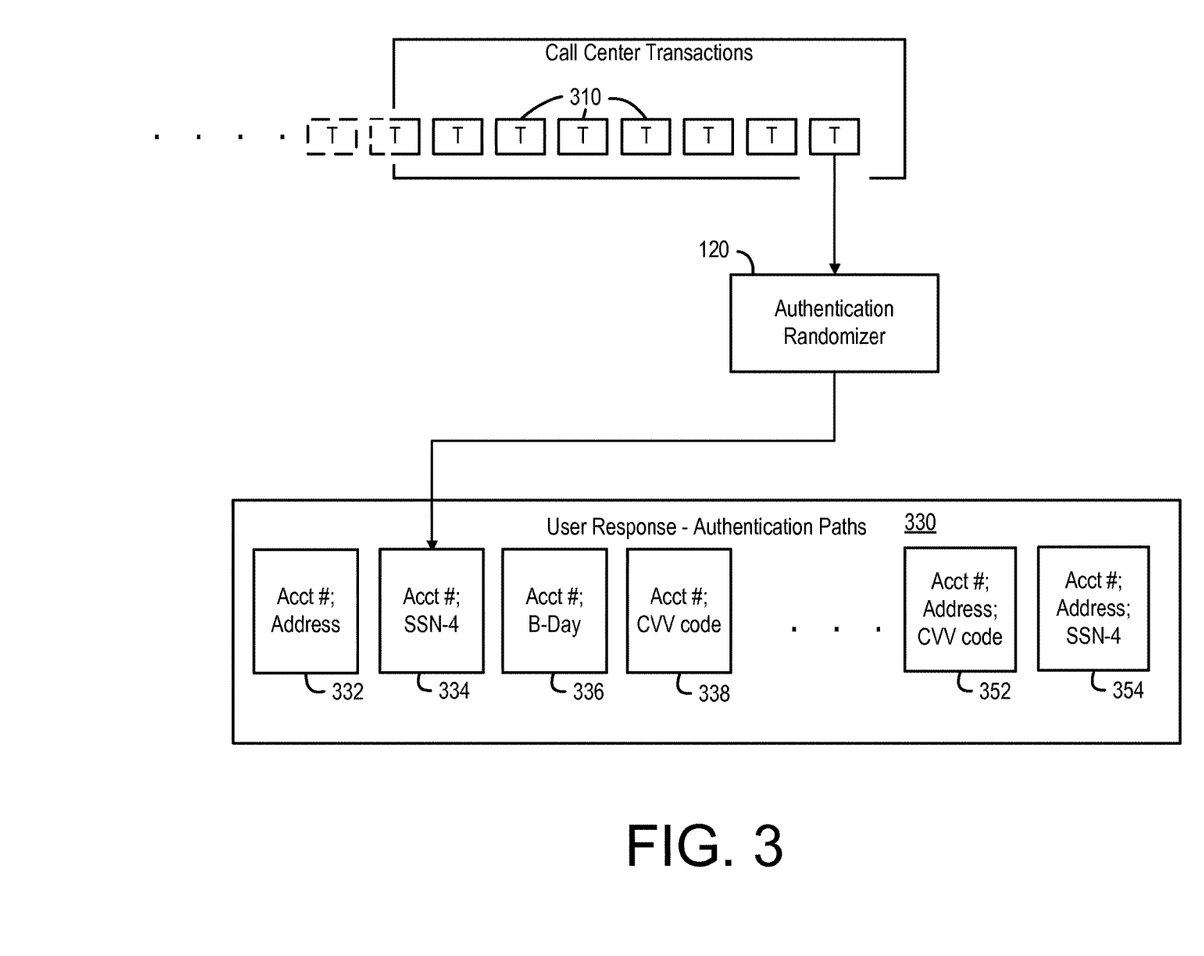
FIG. 3 is a schematic diagram of an authentication process for call center operation according to an example embodiment.

Referring now to FIGS. 2-3, FIGS. 2-3 show similar authentication processes to that described in FIG. 1. In FIG. 2, the authentication process is provided in the context of a store location. In FIG. 3, the authentication process is provided in the context of a call center.

Referring next to FIG. 2, FIG. 2 shows operation of an authentication process in the context of a store location (e.g., branch office location) according to an example embodiment. As shown in FIG. 2, the system receives an ongoing stream of transaction requests 210 (e.g., customers entering store locations to perform transactions). In the context of a store location, the transaction request may, for example, be a request to perform one or more transactions at the store location. After the user is authenticated, the transaction request is approved and the user is permitted to specify the transaction(s) to be performed. The authentication may remain effective for a period of time (e.g., during the time period that the user is at the store location following authentication). Authentication randomizer 120 sends the transaction down one of a plurality of available authentication paths 230. Different paths may comprise random variations in the content, sequence and/or number of responses that the individual needs to provide in order to be authenticated. For example, authentication paths 232-242 respectively require photo verification, an ATM card swipe, all or a portion of the individual's social security number, the individual's birthday, and a signature verification. For higher value transactions, authentication paths 252 and 254 are shown that comprise an additional authentication step. By introducing such variations, the authentication randomizer 120 impairs the ability of fraudsters to carry out an automated attack.

In the context of a branch location, the randomness may discourage fraudsters from attempting to carry out fraudulent transactions. For example, if the fraudster knows that he will be asked to provide the customer's birthday as part of the authentication process, then the fraudster will be encouraged to attempt the fraudulent transaction so long as the fraudster knows the customer's birthday. If, however, if the fraudster does not know what information the fraudster will be asked to provide, only that such information is information that would likely be known by the account holder, then the fraudster may be more reluctant to attempt the fraudulent transaction.

Referring next to FIG. 3, FIG. 3 shows operation of an authentication process in the context of a call center according to an example embodiment. As shown in FIG. 3, the system receives an ongoing stream of transaction requests 310 (e.g., callers calling into the call center). In the context of a call center, the transaction request may, for example, be a request to perform one or more transactions over the telephone. After the user is authenticated, the transaction request is approved and the user is permitted to specify the transaction(s) to be performed. The authentication may remain effective for a period of time (e.g., during the duration of the telephone call). Authentication randomizer 120 sends the transaction down one of a plurality of available authentication paths 330. Different paths may comprise random variations in the content, sequence and/or number of responses that the individual needs to provide in order to be authenticated. For example, authentication paths 332-342 respectively require a street address, all or a portion of the individual's social security number, the individual's birthday, a CVV code (in the case of credit card accounts), and so on. For higher value transactions, authentication paths 352 and 354 are shown that comprise an additional authentication step. By introducing such variations, the authentication randomizer 120 impairs the ability of fraudsters to carry out an automated attack.

Figure 4:
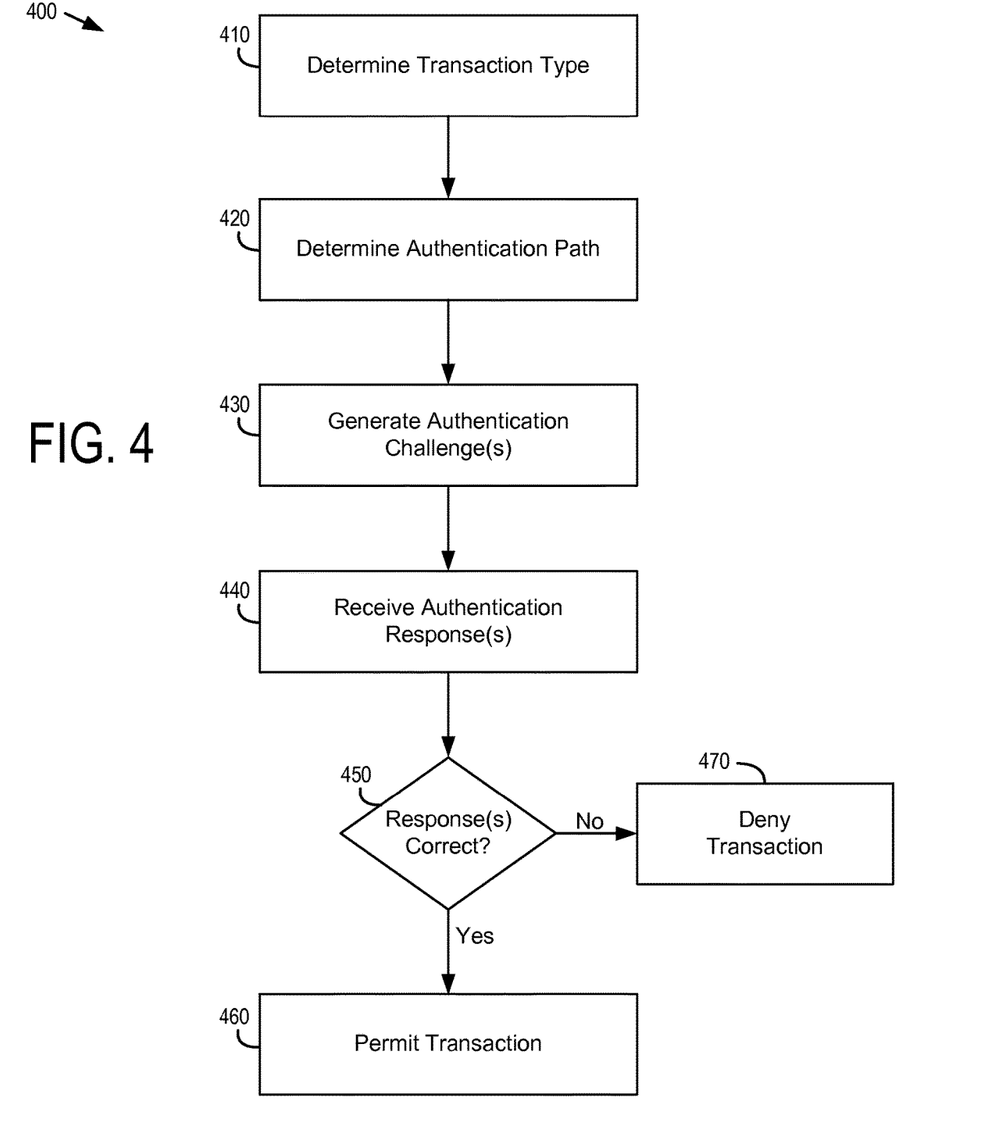
FIG. 4 is a flowchart of an authentication process according to an example embodiment.

Referring now to FIG. 4, a flowchart showing an authentication process is illustrated. At step 410, it is determined whether the transaction meets predetermined parameters that characterize a transaction type. For example, if randomness is introduced into the authentication process for all funds transfers in excess of a threshold dollar value, then at step 410 it is determined whether the requested transaction meets such parameters. In some embodiments, the manner in which randomness is introduced is not based on transaction type and, hence, step 410 is not performed.

At step 420, an authentication path may then be determined. At step 430, an authentication challenge may be generated. At step 440, an authentication response may be received. At step 450, it is determined whether the authentication response is correct. As will be appreciated, although steps 410-450 are shown as being performed sequentially in a certain order, in practice, steps 410-450 may be performed concurrently and in an order different than that shown. For example, a user may be presented with an authentication challenge to provide a login ID and password (steps 430, 440). After determining that the login ID and password combination provided is correct (step 450), a further authentication challenge may be generated (step 430). Additional authentication challenges may also be subsequently generated depending on a determined transaction type (step 410). If the authentication responses provided are all correct, then the user is authenticated and the transaction(s) is permitted (step 460). If the authentication response is not correct, then the user is not authenticated and the transaction(s) are not permitted (step 470).

Figure 5:
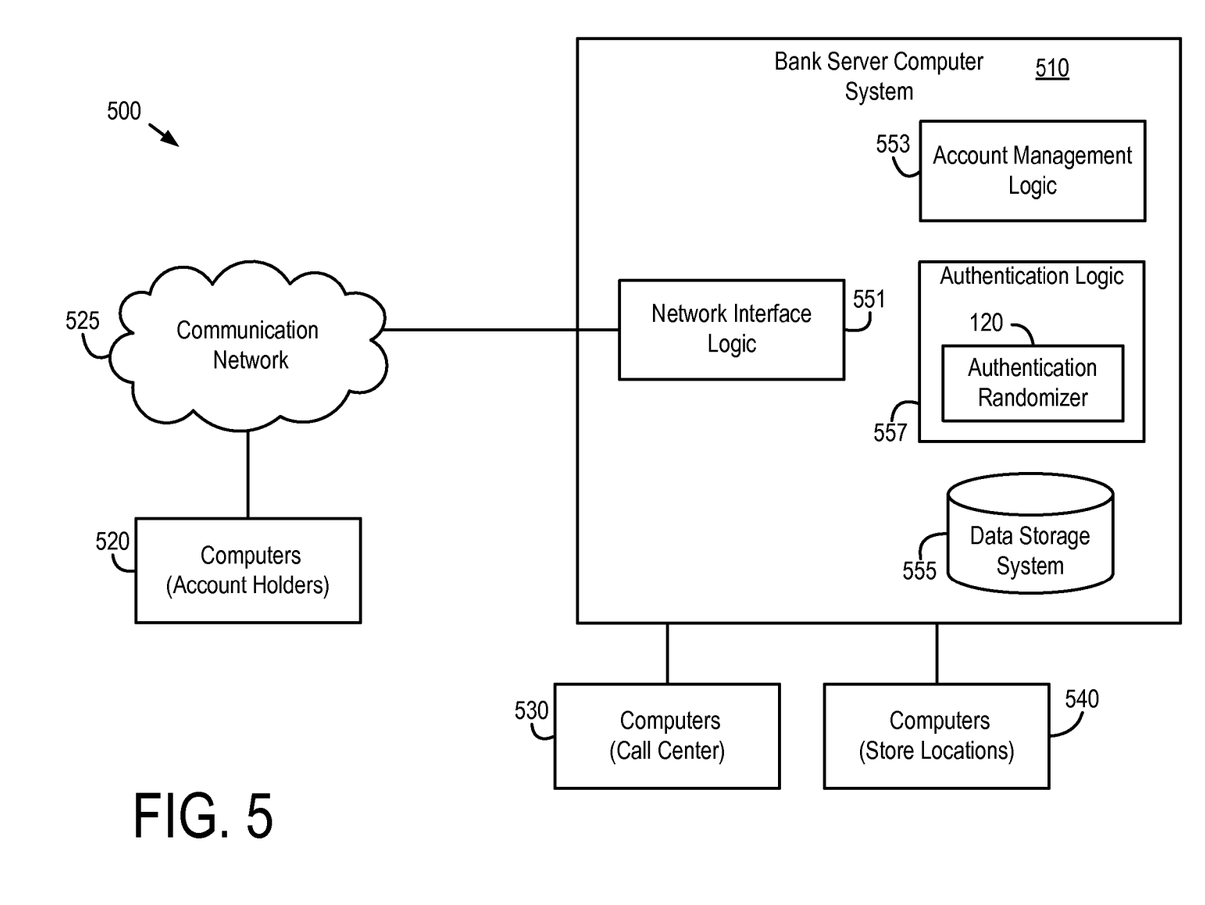
FIG. 5 is a hardware system in which customers may access accounts according to an example embodiment.

Referring to FIG. 5, FIG. 5 shows a system 500 including a bank computer system 510 according to an example embodiment. The bank computer system 510 may be accessed by account holders through computers 520 (e.g., personal computers, mobile devices, and so on) via a communication network 525 (e.g., the internet). The computers 520 may be used by customers (i.e., account holders) of the bank to access their accounts. The system 510 may also be accessed by computers 530 at call centers operated by the bank, by computers 540 at branch locations, and/or by other computers.

The bank computer system 510 includes network interface logic 551, account management logic 553, data storage system 525, authentication logic 557. In practice, the bank computer system 510 including logic 551-557 may be implemented by computer systems, for example, comprising one or more networked computer servers having non-transitory machine readable media. The logic 551-557 may therefore be implemented as program logic circuits that are stored on the non-transitory machine-readable storage media and that, when executed by processor(s) of the server(s), causes the servers to perform the operations described herein.

Network interface logic 551 may, for example, be configured to connect the bank computer system 510 to the Internet or other publicly accessible communication network 525 to permit account holders to access the bank computer system 510 through an on-line banking area of a website of the bank. For example, network interface logic 551 may be configured to generate a graphical user interface (e.g., one or more dynamically generated web pages presented to the customer via a browser application operating at computers 520). The user interface may prompt the users to take certain actions and may receive user inputs provided in response to such prompting. Network interface logic 551 may also comprise other logic that is configured to provide an interface for other types of devices such as mobile devices (cell phones, smart phones, and so on). Network interface logic 551 may also be configured to interface the bank server computer system 510 with call center computers 530 and store location computers 540 via an internal network.

Account management logic 553 includes stored program logic that performs various tasks in connection with accounts held by account holders at the financial institution. For example, the account management logic 553 may perform account processing to process transactions in connection with the account(s) of the account holder, such as account debits and credits to checking and savings accounts, credits and debits to home mortgage and home equity accounts, credits and debits to student loan accounts, and so on. For example, in the context of demand deposit accounts, the transactions may also include funds transfers in which funds are transferred into or out of such accounts (e.g., electronic bill payment transactions in which monies from the checking account of the user are used to pay bills received by the user). Account management logic 553 may also generate statements for the user relating to the user's account(s).

The data storage system 555 may include an account database configured to store account-related information generated by the account management logic 553, such as logs of each transaction performed by the account management logic 553. The account management logic 553 may store data related to the account in data storage system 555. The data storage system 555 may be configured store other information such as account balance and other account holder related information (e.g., preferences, profiles, login credentials, and so on).

The authentication logic 557 includes program logic configured to authenticate users attempting to perform transactions. For example, the authentication logic 557 may authenticate users at the on-line banking area of the website of the bank (e.g., based on login name/password and other credentials such as responses to challenge questions). The authentication logic 557 performs the operations described above in connection with FIGS. 1-4 and includes the authentication randomizer 120 described above in connection with FIGS. 1-4.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include one or more general purpose computers including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method comprising:
   receiving, by a processor, an indication that a user wishes to conduct a transaction;
   determining, by the processor, that the transaction meets a predetermined parameter that characterizes a transaction type requiring a pseudo-random authentication process;
   pseudo-randomly determining an authentication path to be presented to the user, the authentication path comprising a combination of selected authentication challenges to be presented to the user, the selected authentication challenges pseudo-randomly selected from a plurality of authentication challenges comprising at least a first authentication challenge, a second authentication challenge, and a third authentication challenge, wherein the authentication path presents the selected authentication challenges in a pseudo-random order, wherein at least a first portion of the authentication path is determined prior to receiving the indication that the user wishes to conduct the transaction, wherein a second portion of the authentication path is determined after the transaction to be performed has been specified, wherein the authentication path is common to all users attempting to conduct transactions for a designated time period;
   modifying, by the processor, the authentication path when the user is in a location of another user, the authentication path being modified to present the selected authentication challenges in a second order instead of a first order, wherein the first order and the second order are different from each other;
   determining, by the processor, whether the user presented valid responses to the selected authentication challenges; and
   authenticating, by the processor, the user to conduct the transaction based on whether the user presented valid responses to the selected authentication challenges.

2. The method according to claim 1,
   wherein at least one of the authentication challenges is an authentication question that the user must answer in order to be authenticated,
   wherein determining whether the user presented valid responses to the authentication challenges comprises determining whether the user provided a valid answer to the authentication question, and
   wherein pseudo-randomly determining the authentication path comprises pseudo-randomly selecting the authentication question to be presented to the individual from among a plurality of authentication questions available to be presented to the user and for which answers are stored in a data storage system of the processor.

3. The method according to claim 2, wherein the second authentication question requests one of a credit verification value, a birthday, a portion of a social security number, and arbitrary information provided by the individual.

4. The method according to claim 1,
   wherein at least one of the authentication challenges is an authentication task that the user must perform in order to be authenticated,
   wherein determining whether the user presented valid responses to the authentication challenges comprises determining whether the user performed the authentication task, and
   wherein pseudo-randomly determining the authentication path comprises pseudo-randomly selecting the authentication task to be presented to the individual from among a plurality of authentication tasks available to be presented to the user.

5. The method according to claim 2, wherein the authentication task comprises one of swiping a transaction card, providing photo identification, entering a personal identification number, and providing a signature.

6. The method according to claim 1, wherein pseudo-randomly determining the authentication path comprises pseudo-randomly determining a quantity of authentication challenges to be presented to the user.

7. The method according to claim 1,
   wherein the first authentication challenge is a first authentication question requesting a valid login ID and password combination,
   wherein the second authentication challenge is a second authentication question requesting one of a credit verification value, a birthday, a portion of a social security number, and arbitrary information provided by the individual, and
   wherein pseudo-randomly determining the authentication path comprises pseudo-randomly selecting the second authentication question.

8. The method according to claim 1, wherein the transaction comprises at least one of withdrawing funds, purchasing one or more goods or services, transferring funds from one account to another account, and changing account information.

9. The method according to claim 1, wherein the transaction is associated with a dollar value, wherein the predetermined parameter includes an indicated threshold dollar value, and wherein the dollar value is greater than the threshold dollar value.

10. The method according to claim 1, wherein the indication that the user wishes to conduct the bank transaction is received via an online banking website or a call center.

11. The method according to claim 1, wherein the indication that the user wishes to conduct the bank transaction is received at a store location.

12. The method according to claim 1, wherein one of the predetermined parameters is presence inside of a store location.

13. The method according to claim 1, further comprising pseudo-randomly determining a second authentication path to be presented to the second user, wherein the modified authentication path of the user and the second authentication path are a same path.

14. The method according to claim 13, wherein the second authentication path is determined to be a same path as the modified authentication path responsive to the second user to requesting a transaction and responsive to the second user requesting a transaction within a same time period.

15. A computer system comprising a processor and non-transitory machine readable storage media having instructions stored therein that, when executed by the processor, cause the processor to:
receive an indication that a user wishes to conduct a transaction; determine that the transaction meets a predetermined parameter that characterizes a transaction type that requires a pseudo-random authentication process;
pseudo-randomly determine an authentication path to be presented to the user, the authentication path comprising a combination of selected authentication challenges to be presented to the user, the selected authentication challenges pseudo-randomly selected from a plurality of authentication challenges comprising at least a first authentication challenge, a second authentication challenge, and a third authentication challenge, wherein the authentication path presents the selected authentication challenges in a pseudo-random order, wherein at least a first portion of the authentication path is determined prior to receiving the indication that the user wishes to conduct a transaction, wherein a second portion of the authentication path is determined after the transaction to be performed has been specified, wherein the authentication path is common to all users attempting to conduct transactions for a designated time period;
modifying, by the processor, the authentication path when the user is in a location of another user, the authentication path being modified to present the selected authentication challenges in a second order instead of a first order, wherein the first order and the second order are different from each other;
determine whether the user presented valid responses to the selected authentication challenges; and
authenticate the user to conduct the transaction based on whether the user presented valid responses to the selected authentication challenges.

16. The computer system according to claim 15,
wherein at least one of the authentication challenges is an authentication question that the user must answer in order to be authenticated,
wherein determining whether the user presented valid responses to the authentication challenges comprises determining whether the user provided a valid answer to the authentication question, and wherein pseudo-randomly determining the authentication path comprises pseudo-randomly selecting the authentication question to be presented to the individual from among a plurality of authentication questions available to be presented to the user and for which answers are stored in a data storage system of the computer system.

17. The computer system according to claim 16, wherein the second authentication question requests one of a credit verification value, a birthday, a portion of a social security number, and arbitrary information provided by the individual.

18. The computer system according to claim 15,
wherein at least one of the authentication challenges is an authentication task that the user must perform in order to be authenticated,
wherein determining whether the user presented valid responses to the authentication challenges comprises determining whether the user performed the authentication task, and
wherein pseudo-randomly determining the authentication path comprises pseudo-randomly selecting the authentication task to be presented to the individual from among a plurality of authentication tasks available to be presented to the user.

19. The computer system according to claim 18, wherein the authentication task comprises one of swiping a transaction card, providing photo identification, entering a personal identification number, and providing a signature.

20. The computer system according to claim 15, wherein pseudo-randomly determining the authentication path comprises pseudo-randomly determining a quantity of authentication challenges to be presented to the user.

21. The computer system according to claim 15,
wherein the first authentication challenge is a first authentication question requesting a valid login ID and password combination,
wherein the second authentication challenge is a second authentication question requesting one of a credit verification value, a birthday, a portion of a social security number, and arbitrary information provided by the individual, and
wherein pseudo-randomly determining the authentication path comprises pseudo-randomly selecting the second authentication question.

22. The computer system according to claim 15, wherein the transaction comprises at least one of withdrawing funds, purchasing one or more goods or services, transferring funds from one account to another account, and changing account information.

23. The computer system according to claim 15, wherein the indication that a user wishes to conduct the bank transaction is received via a call center.

24. The computer system according to claim 15, wherein the indication that the user wishes to conduct the bank transaction is received via an online banking website.

25. The computer system according to claim 15, wherein the indication that the user wishes to conduct the bank transaction is received via a store location.

26. The computer system according to claim 15, wherein the authentication path is determined prior to the receiving step, and wherein the authentication path is presented to all users with transaction requests meeting predetermined parameters.

27. The computer system according to claim 15, wherein a second portion of the authentication path is determined after the transaction to be performed has been specified.

* * * * *